2,863,777
MEAT COLOR PRESERVING COMPOSITION

Adriaan Dekker, Deventer, Netherlands, assignor, by mesne assignments, to Vasco Industries Corp., New York, N. Y., a corporation No Drawing. Application April 6, 1956
Serial No. 576,536

Claims priority, application Netherlands April 7, 1955

7 Claims. (Cl. 99—157)

This invention relates to a meat-color preserving agent. It is the object of my invention to provide a new meat color preserving agent of such composition that the meat treated with the same preserves a more natural color for a much longer period than meat treated with known color preserving agents.

For the sale of meat products and meat it is of the utmost importance that the meat products present in the selling space keep a fresh appetizing appearance. Especially in the warmer seasons this is a constant source of concern to the retailer. The artificial cooling of counter display cases and window display spaces constitutes only a partial solution of this problem, which, moreover, frequently cannot be applied because of the prohibitive cost. Under the influence of the oxygen from the air reactions are apt to occur on the surface of the meat, especially at higher temperatures, which reactions result in a discoloration to a grey and unsightly hue. The meat products have a less appetizing appearance and are unsalable in this condition. This is due to the fact that the oxygen from the air converts the meat colouring agents haemoglobin and myoglobin via the compounds oxyhaemoglobin and oxymyoglobin into metahaemoglobin and metamyoglobin respectively, which compounds are grey in colour. Such discoloration sets in particularly quickly whenever the weather changes, for instance from dry to humid weather, from cold weather into warm, from freezing weather to thaw, and also during the dog days, i. e. the sultry close part of the summer, and generally when a high degree of humidity occurs together with temperatures above 12° C.

For the prevention of this discoloration it is known to apply sodium sulfite. This compound is sprinkled or sprayed in the form of a dry powder on the meat or the meat products and rubbed into the surface layers of the meat. In preparing minced meat, sodium sulfite can already be added before the mincing of the meat, in consequence of which good distribution is achieved. I believe that the favourable effect of this addition is due to the strong reducing power of the sulfite, which brings about a regeneration of oxyhaemoglobin and oxymyoglobin, i. e. the two compounds having a bright red colour, from eventually formed grey metahaemoglobin and metamyoglobin respectively.

For the same purposes use has already been made of ascorbic acid in the process described in Patent No. 2,541,572. According to the process described in the patent supra good results are obtained when 110 mg. of ascorbic acid are used per kg. of meat.

Furthermore Patent No. 2,491,646 describes the use of nicotinic acid, alone or in combination with ascorbic acid. Satisfactory results are said to be obtained by the use of 660 mg. of nicotinic acid per kg. of meat, alone or in combination with ascorbic acid in quantity of about one sixth of the nicotinic acid used. Both aforesaid patents require the use of ascorbic acid in conjunction with nicotinic acid in the quantities stated above and expressly state that a reduction in the quantities of ascorbic acid and nicotinic acid mentioned above would lead to inferior products.

Contrary to expectation, reducing sugars per se, such as glucose, lactose etc. have only a very small if any color-preserving effect on meat and meat products, even if relatively large quantities of reducing sugars are used. Usually no effect whatsoever is observed.

The present invention is based on my surprising discovery that the combined base of a reducing sugar and a $\beta$-substituted pyridine derivative together with ascorbic acid brings about an unexpected increase of the color-preserving effect. Due to the presence of a reducing sugar in the combined base a determinal color effect can already be achieved with considerably smaller quantities of $\beta$-substituted pyridine derivatives such as nicotinic acid and ascorbic acid than would be the case if exclusively these two compounds were used. Contrary to the requirements in the two patents supra I have found that, if reducing sugars are present in the combination, a maximum color-preserving effect is obtained also with a mixture of nicotinic acid and ascorbic acid, the latter two being present in an approximately equimolecular ratio.

Consequently my invention consists in the production of a preparation for preserving the color of meat products and meat, which is characterized in that provision is made for the presence of a $\beta$-substituted pyridine derivative and ascorbic acid and of reducing sugars. The quantity of reducing sugar in this preparation is preferably equal to or greater than the total quantity of $\beta$-substituted pyridine derivative and ascorbic acid, because in that case the activating effect of the reducing sugar becomes clearly apparent. Further the pyridine derivative and ascorbic acid are preferably present in a molar ratio of 1:1. Even with high to very high sugar concentrations, e. g. such that the quantity of $\beta$-substituted pyridine derivative and ascorbic acid amounts to only 1–10% of the quantity of reducing sugar, the extra effect is still present. Thus a mixture may successfully be applied which consists of 98% of glucose and and 2% of ascorbic acid and nicotinic acid. In spite of the excessive quantity of sugar no negative effect of the sugar is yet to be perceived.

In view of the high price of the substances used according to the above-mentioned U. S. patent specifications this discovery amounts to a considerable saving, owing to which a more general application of a color-preserving preparation becomes possible. In contrast with the sometimes harmful sodium sulfite the mixture according to the invention forms a valuable admixture from a nutritional point of view, since both ascorbic acid and the $\beta$-substituted pyridine derivative belong to the class of the vitamins.

A suitable $\beta$-substituted pyridine derivative is formed in the first place by nicotinic acid and its salts. Further e. g. the esters and amides of nicotinic acid, such as ethyl nicotinate, nicotinic acid N-methylamide, can be used, further $\beta$-picoline, the components of the mixture can be applied successively to the meat surface, or a mixture of the same can be prepared for instance immediately before use and then applied. It is also possible to prepare stable mixture for storage.

The mixtures composed according to the invention are preferably sprinkled or sprayed in the form of a dry powder on the meat or the meat products, and distributed on the surface by rubbing. When minced meat is prepared, the ingredients can be advantageously mixed and applied to the meat immediately before the latter is minced.

It is also possible to prepare an aqueous solution and to dip the meat products into the solution or spray them therewith.

Finally it is possible to inject an aqueous solution into the meat, e. g. with the device that is used for injecting brine into hams. All reducing sugars, such as glucose, fructose, lactose or maltose can be used for the purpose of my invention. The amount of sugar which is added, is preferably 2 to 4 grams per kilogram of meat; an effect is already noticeable with an addition of only 0.2 (g.) and is pronounced when a quantity of 0.5 (g.) is added. Normally not more than 10.0 (g.) of sugar are added, the upper limit being about 25 (g.) per kg. of meat.

The resulting meat product preserves its natural red color for at least 12 hours regardless of the afore-mentioned weather conditions, and contains per kilogram only from 0.5 to 25 and preferably from 2 to 10 grams of reducing sugar and less than 0.5 gram and preferably less than 0.2 gram of a mixture of a $\beta$-substituted pyridine derivative and ascorbic acid.

*Example I*

1000 g. of minced meat are sprinkled with a mixture of 75 mg. of nicotinic acid, 100 mg. of ascorbic acid and 1000 mg. of glucose. After some kneading the mass is kept at room temperature. The bright red meat color which appears in about 15 minutes is very intense and shows no change after 12 hours; a change in the color begins only after 36 hours.

For the sake of comparison 1000 g. of minced meat taken from the same piece of meat as used in the above test are sprinkled with a mixture of 250 mg. of nicotinic acid and 600 mg. of ascorbic acid (U. S. patent specification No. 2,491,646). After some kneading the mass is kept at room temperature. The meat color which appears in about 15 minutes, is pale red and not bright red as that obtained with the meat color preserving agent according to my invention, and is maintained for only 6 hours.

1000 g. of minced meat taken from the same piece as used in the first test are sprinkled with a mixture of 660 mg. of nicotinic acid and 110 mg. of ascorbic acid (U. S. Patent No. 2,491,646). After some kneading the mass is kept at room temperature. The meat color which appears in about 15 minutes is pale red and not bright red as that obtained with the meat color preserving agent according to my invention and is maintained for only 3 hours.

*Example II*

1000 g. of the same piece of meat as used in Example I are again minced and sprinkled with a mixture of 80 mg. of nicotinic acid amide, 100 mg. of ascorbic acid, and 9000 mg. of glucose. One to 15 minutes after the addition of the agent the meat assumes the desired bright red color, which remains unchanged after 12 hours and begins to change only after 36 hours.

*Example III*

3000 g. of minced meat are split up into 3 equal portions of 1000 g. each. One of these portions is sprinkled with 4 g. of glucose; a second portion is treated with a meat color preserving agent according to my invention which consists of a mixture of 120 mg. of ascorbic acid, 80 mg. of nicotinic acid and 3800 mg. of glucose; the third portion is left untreated. After periods of 2 hours the color of these three portions is repeatedly examined until finally putrefaction sets in. With every test the meat treated with glucose alone is found to show a rapid discoloring, which is even worse than that of the untreated meat portion. The portion treated with the mixture according to the invention preserves a fresh red color until shortly before putrefaction, which begins only after 40 hours.

*Example IV*

Three portions of minced meat, of 1000 g. each and taken from the same piece of meat, are treated (*a*) with a mixture of 180 mg. of ascorbic acid and 120 mg. of nicotinic acid, (*b*) with a meat color preserving agent according to my invention which consists of a mixture of 180 mg. of ascorbic acid, 120 mg. of nicotinic acid, and 3125 mg. of glucose, and (*c*) with a mixture of 660 mg. of nicotinic acid and 110 mg. of ascorbic acid respectively.

A fourth portion of minced meat, also taken from the same piece of meat is left untreated. The color of the latter portion changes after ½ to 1 hour from red to grey, and preserves the color until putrefaction, which begins after 40 hours. The meat to which 180 mg. of ascorbic acid and 120 mg. of nicotinic acid alone have been added presents its natural red color for 3 hours, whereupon the color changed definitely to grey; whereas the meat to which 660 mg. of nicotinic acid and 110 mg. of ascorbic acid added preserves its natural red color for only 2½ hours. Putrefaction sets in after 48 hours.

The portion treated with the mixture of ascorbic acid, nicotinic acid and glucose completely preserves its natural red meat color for 36 hours, putrefaction setting in after 48 hours.

*Example V*

Under atmospheric conditions which are highly unfavourable for the preservation of the color of meat change from dry weather to humid weather at a temperature of 28 C. 1000 mg. of minced meat are treated with a meat color preserving mixture according to the invention which consists of 246 mg. of nicotinic acid, 185 mg. of ascorbic acid, and 3210 mg. of glucose.

For purposes of comparison 1000 g. of minced meat taken from the same piece of meat are kept under identical conditions. After 16 hours the untreated minced meat is unsealable on account of an extraordinarily unattractive grey color, whereas the minced meat treated according to the invention still preserves its pleasant fresh meat color. 46 hours after the treatment putrefaction sets in.

*Example VI*

1000 g. of minced meat are sprinkled with a mixture of 75 mg. of nicotinic acid, 100 mg. of ascorbic acid and 1000 mg. of fructose. After some kneading the mass is kept at room temperature. The bright red meat color that appears in about 15 minutes is very intense and shows no change after 12 hours; a change in the color is only noticeable after 36 hours.

*Example VII*

1000 g. of slightly discolored meat are sprinkled with a mixture of 75 mg. of nicotinic acid, 100 mg. of ascorbic acid, and 1000 mg. of lactose. After some kneading the mass is kept in room temperature. The bright red meat color that appears in about 15 minutes is very intense and shows no changes after 12 hours; a change in color sets in only after 36 hours.

*Example VIII*

1000 g. of slightly discolored minced meat are sprinkled with a mixture of 85 mg. of ethyl nicotinate, 120 mg. of ascorbic acid and 5000 mg. of glucose. After some kneading the mass is kept at room temperature. The bright red meat color that appears in about 15 minutes remains until putrefaction sets in after about 48 hours.

Various changes and modifications may be made in the invention as specifically exemplified including variations in the relative proportion of the components within the limits indicated above.

Since the changes and modifications may be made without departing from the spirit and scope of the invention, it is to be understood that it is not intended to limit the invention exception as defined in the appended claims.

What I claim is:

1. A meat color preserving composition ocmprising at least one reducing sugar, a $\beta$-substituted pyridine derivative, and ascorbic acid, the amount of reducing sugar in said composition being at least equal to the combined amounts of β-substituted pyridine derivative and ascorbic acid, and the latter two components being present in an approximate molar ratio of about 0.8:1 to 2:1, thereby prolonging the preservation of the natural red color of the meat treated with said composition to more than 12 hours.

2. A meat color preserving composition as described in claim 1, characterized in that the β-substituted pyridine derivative is nicotinic acid.

3. A meat color preserving composition comprising at least one reducing sugar, a β-substituted pyridine derivative and ascorbic acid characterized in that the combined quantities of β-substituted pyridine derivative and ascorbic acid amount to from 1 to 10% of the quantity of reducing sugar, the amount of reducing sugar in said composition being at least equal to the combined amount of β-substituted pyridine derivative and ascorbic acid, and the latter two components being present in an approximate molar ratio of about 0.8:1 to 2:1, thereby prolonging the preservation of the natural red color of the meat with said composition to more than 12 hours.

4. A meat color preserving composition comprising at least one reducing sugar, a β-substituted pyridine derivative and ascorbic acid, and the ratio of the amounts of the β-substituted pyridine and the ascorbic acid being approximately that of their respective molecular weights the amount of reducing sugar in the composition being in the order of 98% of the total weight of the latter.

5. The method of preserving the natural red color of meat by treating the surface of the latter with a composition as described in claim 1.

6. The method of preserving the natural red color of meat by adding to the latter a composition as described in claim 1 in such quantity that from 0.2 gram to 25 grams of reducing sugar are introduced into each kilogram of meat.

7. The method of preserving the natural red color of meat by adding to the latter a composition as described in claim 1 in such quantity that from 2 to 10 grams of reducing sugar are introduced into each kilogram of meat.

References Cited in the file of this patent

UNITED STATES PATENTS

| | | |
|---|---|---|
| 2,147,261 | Lewis | Feb. 14, 1939 |
| 2,491,646 | Coleman et al. | Dec. 20, 1949 |
| 2,541,572 | Coleman et al. | Feb. 13, 1951 |
| 2,553,533 | Komarik et al. | May 15, 1951 |